United States Patent
Wagner et al.

(10) Patent No.: US 10,484,457 B1
(45) Date of Patent: Nov. 19, 2019

(54) CAPTURING AND AUTOMATICALLY UPLOADING MEDIA CONTENT

(71) Applicant: Google LLC, Mountain View, CA (US)

(72) Inventors: Mark Wagner, Clyde Hill, WA (US); Thomas H. Taylor, Redmond, WA (US); David P. Conway, Los Altos, CA (US)

(73) Assignee: Google LLC, Mountain View, CA (US)

( * ) Notice: Subject to any disclaimer, the term of this patent is extended or adjusted under 35 U.S.C. 154(b) by 92 days.

(21) Appl. No.: 15/493,527

(22) Filed: Apr. 21, 2017

Related U.S. Application Data

(63) Continuation of application No. 13/772,256, filed on Feb. 20, 2013, now Pat. No. 9,667,694, which is a continuation of application No. 11/937,976, filed on Nov. 9, 2007, now Pat. No. 8,385,950.

(51) Int. Cl.
*H04L 29/08* (2006.01)

(52) U.S. Cl.
CPC .............. *H04L 67/06* (2013.01); *H04L 67/02* (2013.01); *H04L 67/04* (2013.01)

(58) Field of Classification Search
CPC ... H04L 67/04; H04L 29/06027; H04L 67/02; H04L 67/2842; H04L 69/329; H04L 65/4084; H04L 65/60; H04N 1/00132; H04N 1/00151; H04N 2101/00; H04N 21/2743; H04N 2201/0084; H04N 1/00156; H04N 1/00169; H04N 1/00172; H04N 1/00177

See application file for complete search history.

(56) References Cited

U.S. PATENT DOCUMENTS

| 6,784,925 B1 | 8/2004 | Tomat et al. |
| 7,034,880 B1 | 4/2006 | Endsley et al. |

(Continued)

OTHER PUBLICATIONS

Dumas. 'Wired.com' [online]. "Totally Awesome: Eye-Fi Card Reader Uploads Digital Pics Via Wi-Fi," 2007, [retrieved on Nov. 7, 2008]. Retrieved from the Internet: URL<http://blog.wired.com/gadgets/2007/10/totally-awesome.html>. 3 pages.

(Continued)

*Primary Examiner* — Shean Tokuta
(74) *Attorney, Agent, or Firm* — Fish & Richardson P.C.

(57) ABSTRACT

A computer-implemented method for automatically uploading media content from a mobile device to an online service provider can include receiving, in the mobile device, identifying information corresponding to a user account associated with at least one of a plurality of online service providers; capturing media content with a media input component included in the mobile device; and after the media content is captured, automatically uploading to the at least one online service provider the captured media content and the identifying information, without receiving user input contemporaneous with the automatic uploading that specifies that the captured media content is to be uploaded. The mobile device can further include a wireless communication component configured to wirelessly send data to and wirelessly receive data from the plurality of online service providers, which can be external to the mobile device.

20 Claims, 10 Drawing Sheets

(56) References Cited

U.S. PATENT DOCUMENTS

| | | | |
|---|---|---|---|
| 7,424,310 B1* | 9/2008 | Barbeau | H04M 1/72555 365/15 |
| 7,551,210 B2 | 6/2009 | Katayama | |
| 7,639,943 B1* | 12/2009 | Kalajan | G03B 29/00 396/429 |
| 7,904,529 B2* | 3/2011 | Azulai | H04L 65/4092 709/204 |
| 8,099,343 B1* | 1/2012 | O'Neil | G06Q 20/123 705/34 |
| 8,224,776 B1 | 7/2012 | Anderson et al. | |
| 8,385,950 B1 | 2/2013 | Wagner et al. | |
| 8,676,913 B1* | 3/2014 | Roche | H04L 51/32 709/206 |
| 2002/0138619 A1 | 9/2002 | Ramaley et al. | |
| 2003/0007200 A1 | 1/2003 | Mcintyre | |
| 2004/0004737 A1 | 1/2004 | Kahn et al. | |
| 2004/0177117 A1 | 9/2004 | Huang | |
| 2004/0199303 A1 | 10/2004 | Ohmura et al. | |
| 2004/0201709 A1 | 10/2004 | Mcintyre et al. | |
| 2005/0075895 A1 | 4/2005 | Mohsenin et al. | |
| 2005/0273489 A1 | 12/2005 | Pecht et al. | |
| 2006/0095540 A1 | 5/2006 | Anderson et al. | |
| 2006/0107297 A1 | 5/2006 | Toyama et al. | |
| 2006/0234762 A1 | 10/2006 | Ozluturk | |
| 2007/0073766 A1 | 3/2007 | Porter | |
| 2007/0073937 A1 | 3/2007 | Feinberg et al. | |
| 2007/0244749 A1 | 10/2007 | Speiser et al. | |
| 2007/0291323 A1 | 12/2007 | Roncal | |
| 2007/0300260 A1* | 12/2007 | Holm | H04N 5/4401 725/47 |
| 2008/0016193 A1* | 1/2008 | Allen | H04L 12/66 709/223 |
| 2008/0108301 A1 | 5/2008 | Dorenbosch | |
| 2008/0127176 A1 | 5/2008 | Lee et al. | |
| 2008/0133697 A1* | 6/2008 | Stewart | H04M 1/72522 709/217 |
| 2008/0181172 A1 | 7/2008 | Angelhag et al. | |
| 2008/0188180 A1 | 8/2008 | Rahja | |
| 2008/0204317 A1* | 8/2008 | Schreve | H04N 1/00129 342/357.52 |
| 2008/0249777 A1* | 10/2008 | Thelen | G06F 1/1626 704/270 |
| 2008/0275960 A1* | 11/2008 | Myllyla | H04L 67/06 709/217 |
| 2009/0111375 A1* | 4/2009 | Burns | H04N 1/00307 455/3.06 |
| 2009/0113472 A1* | 4/2009 | Sheth | H04N 7/173 725/34 |
| 2011/0183655 A1* | 7/2011 | Cao | G06Q 10/10 455/414.1 |
| 2011/0280476 A1* | 11/2011 | Berger | G06T 11/60 382/163 |
| 2012/0082401 A1* | 4/2012 | Berger | G06F 16/5866 382/306 |
| 2012/0226663 A1* | 9/2012 | Valdez Kline | G06F 16/40 707/640 |
| 2013/0018701 A1* | 1/2013 | Dusig | G06Q 30/02 705/7.32 |
| 2013/0093904 A1 | 4/2013 | Wagner et al. | |
| 2014/0086458 A1* | 3/2014 | Rogers | G10L 15/00 382/118 |
| 2014/0187240 A1 | 7/2014 | Chen | |
| 2014/0189061 A1* | 7/2014 | Stockwell | H04L 29/08117 709/218 |

OTHER PUBLICATIONS

'Engadget' [online]. "JVC's new Everio S Series GZ MS100," 2008, [retrieved on Jun. 23, 2008]. Retrieved from the Internet: URL<http://www.engadget.com/2008/05/19/jvcs-new-everio-s-series-gz-ms100-camcorder-does-youtube-littl/>. 4 pages.

'Flickr' [online]. "flickr," 2007, [retrieved on Dec. 5, 2007]. Retrieved from the Internet: URL<http://www.flickr.com/tour/upload/>. 2 pages.

'Imaging Resource' [online]. "Polaroid's internet-ready camera," 2001, [retrieved on Oct. 31, 2007]. Retrieved from the Internet: URL<http://www.imaging_resource.com/NEWS/992040674.html>. 6 pages.

'IPhoneSlide' [online]. "iPhoneSlide," 2007, [retrieved on Dec. 5, 2007]. Retrieved from the Internet: URL<http://www.iphonslide.com/>. 7 pages.

'Shozu' [online]. The ShoZu blog, "Your online social life . . . in your pocket!," 2007, [retrieved on Nov. 7, 2008]. Retrieved from the Internet: URL<http://shozu.vox.com/library/posts/page/4/4>. 10 pages.

'Twango' [online]. "Twango," 2007, [retrieved on Dec. 5, 2007]. Retrieved from the Internet: URL<http://www.twango.com/tour/overview>. 12 pages.

* cited by examiner

CAPTURING AND AUTOMATICALLY UPLOADING MEDIA CONTENT

CROSS-REFERENCE TO RELATED APPLICATIONS

This application is a continuation of U.S. application Ser. No. 13/772,256, filed Feb. 20, 2013, which is a continuation of U.S. application Ser. No. 11/937,976, filed Nov. 9, 2007. The disclosure of the prior applications are incorporated by reference herein.

TECHNICAL FIELD

This document relates generally to capturing and automatically uploading media content, and in particular, to automatically uploading media content captured by a mobile device to an online service provider.

BACKGROUND

A mobile computing or communication device (e.g., a smartphone, cell phone, personal digital assistant (PDA), etc.) may include a camera that enables a user of the mobile computing or communication device to capture still or video images. Images that are captured by the mobile computing or communication device may be stored on the device, displayed by the device or transferred to external equipment for display or other processing.

External equipment may include various online service providers for sharing media content (e.g., image, audio or video content), such as image-, audio-, or video-sharing service providers (e.g., PICASA™, FLICKR™, PHOTOBUCKET, MYSPACE.COM, FACEBOOK, YOUTUBE, etc.). Users may open user accounts on such online service providers and subsequently use their accounts to store uploaded content and share that content with other designated users or with the general public. To organize uploaded content, online service providers may allow users to create folders and add information to the folders or to content within folders (e.g., keywords, categories, and other classification information for sorting or filtering content). To upload content to an online service provider, the user may employ, for example, a desktop computer and a small application to locate content on the desktop computer and upload it the online service provider (e.g., to the user's account maintained by the online service provider, or to a folder within the user's account). As another example, a user may manually email instances of media content to the online service provider.

SUMMARY

This document describes methods and systems for capturing media content (e.g., image, audio or video content) from a device (e.g., a mobile device, such as a smartphone, cell phone, personal digital assistant (PDA), etc.), and automatically uploading it to an online service provider, such as a media content sharing service. In some implementations, the captured media content may be automatically uploaded to the online service provider without the device receiving contemporaneous user input that specifies that the captured media content is to be uploaded. That is, a user may initially configure his or her device by specifying an online service provider to which captured media content should be automatically uploaded, any necessary account information for the online service provider, and preference information regarding how and when captured media content should be uploaded. Subsequently, the user may capture media content using the device, and the device may automatically upload the captured media content according to the configuration information, without requiring further user action contemporaneous with the uploading.

In some implementations, a computer-implemented method for automatically uploading media content from a mobile device to an online service provider includes receiving, in a mobile device, identifying information corresponding to a user account associated with at least one of the plurality of online service providers. The mobile device can have a media input component configured to capture media content and a wireless communication component configured to wirelessly send data to and wirelessly receive data from a plurality of online service providers that are external to the mobile device. The computer-implemented method can further include capturing media content with the media input component, and after the media content is captured, automatically uploading to the at least one online service provider the captured media content and the identifying information. The media content can be automatically uploaded without the mobile device receiving user input that a) is contemporaneous with the automatic uploading or that b) specifies that the captured media content is to be uploaded to the at least one online service provider.

In some implementations, the mobile device is a smartphone and the media input device comprises at least one of a still-image camera, a video camera and a microphone. In some implementations, the mobile device is a wirelessly-equipped digital camera. In some implementations, the mobile device is a Global Positioning System (GPS)-equipped mobile device, and the captured media content comprises a plurality of GPS-mapped locations corresponding to a route over which the GPS-equipped mobile device traveled. The plurality of online service providers can include online image- and video-sharing service providers. The plurality of online service providers can include online audio-sharing service providers.

Identifying information can include a device identifier associated with the mobile device. Identifying information can include access-control information associated with the user account.

Automatically uploading the captured media content can include automatically uploading with the captured media content corresponding configuration information that causes the captured media content to be made available to the general public by the at least one online service provider. Automatically uploading the captured media content can include automatically uploading with the captured media content corresponding configuration information that causes the captured media content to be made available only to one or more other user accounts associated with one or more of the plurality of online service providers. Automatically uploading the captured media content can include automatically uploading media content that has not been deleted within a predetermined time of being captured. Automatically uploading the captured media content can include automatically uploading portions of the captured media content with the wireless communication component when the wireless communication component has available bandwidth over a channel coupling the mobile device and the at least one online service provider.

The computer-implemented method can further include causing a message to be sent to each of the one or more other user accounts when the captured media content has been automatically uploaded to the at least one online service provider. Causing a message to be sent can include automatically sending an electronic message from the mobile device to the one or more other user accounts. Causing a message to be sent can include providing a control signal to the at least one online service provider that causes the at least one online service provider to send an electronic message to the one or more other user accounts.

The computer-implemented method can further include automatically uploading to a second one of the plurality of online service providers the captured media content. The second online service provider can be different than the at least one online service provider. Automatically uploading to the second online service provider can include automatically uploading without receiving user input that a) is contemporaneous to the automatic uploading to the second online service provider and b) that specifies that the captured media content is to be uploaded to the second online service provider.

Capturing media content can include storing geographical location information associated with the mobile device at a point in time when the media content is captured. Automatically uploading the captured media content can include uploading with the captured media content the stored geographical location information.

The computer-implemented method can further include providing status information in the mobile device that indicates a current status of the automatic uploading of the captured media content to the at least one online service provider.

In some implementations, a device for capturing and automatically uploading media content to an online service provider includes a communication component configured to send data to and receive data from a plurality of online service providers that are external to the device; a media content-capturing component; memory configured to store a) identifying information corresponding to a user account associated with at least one of the plurality of online service providers and b) captured media content that is acquired by the media content-capturing component; and an automatic upload management component configured to automatically upload to the at least one online service provider the captured media content and the identifying information, without receiving contemporaneous user input specifying that the captured media content is to be uploaded to the at least one online service provider. The device can further include a component that provides a function associated with a household appliance, the function selected from the group comprising heating or cooling food or beverage items, washing household items, or drying household items.

In some implementations, a device for capturing and automatically uploading media content to an online service provider includes a communication component configured to send data to and receive data from a plurality of online service providers that are external to the device; a media content-capturing component; memory configured to store a) identifying information corresponding to a user account associated with at least one of the plurality of online service providers and b) captured media content that is acquired by the media content-capturing device; and a means for automatically uploading to the at least one online service provider the captured media content and the identifying information, without receiving contemporaneous user input specifying that the captured media content is to be uploaded to the at least one online service provider.

The details of one or more implementations are set forth in the accompanying drawings and the description below.

DESCRIPTION OF DRAWINGS

Like reference symbols in the various drawings indicate like elements.

DETAILED DESCRIPTION

This document describes methods and systems for capturing media content (e.g., image, audio or video content) from a device (e.g., a mobile device, such as a smartphone, cell phone, personal digital assistant (PDA), etc.), and automatically uploading it to an online service provider, such as a media content sharing service. In some implementations, the captured media content may be automatically uploaded to the online service provider without the device receiving contemporaneous user input that specifies that the captured media content is to be uploaded. That is, a user may initially configure his or her device by specifying an online service provider to which captured media content should be automatically uploaded, any necessary account information for the online service provider, and preference information regarding how and when captured media content should be uploaded. Subsequently, the user may capture media content using the device, and the device may automatically upload the captured media content according to the configuration information, without requiring further user action contemporaneous with the uploading.

Figure 1:
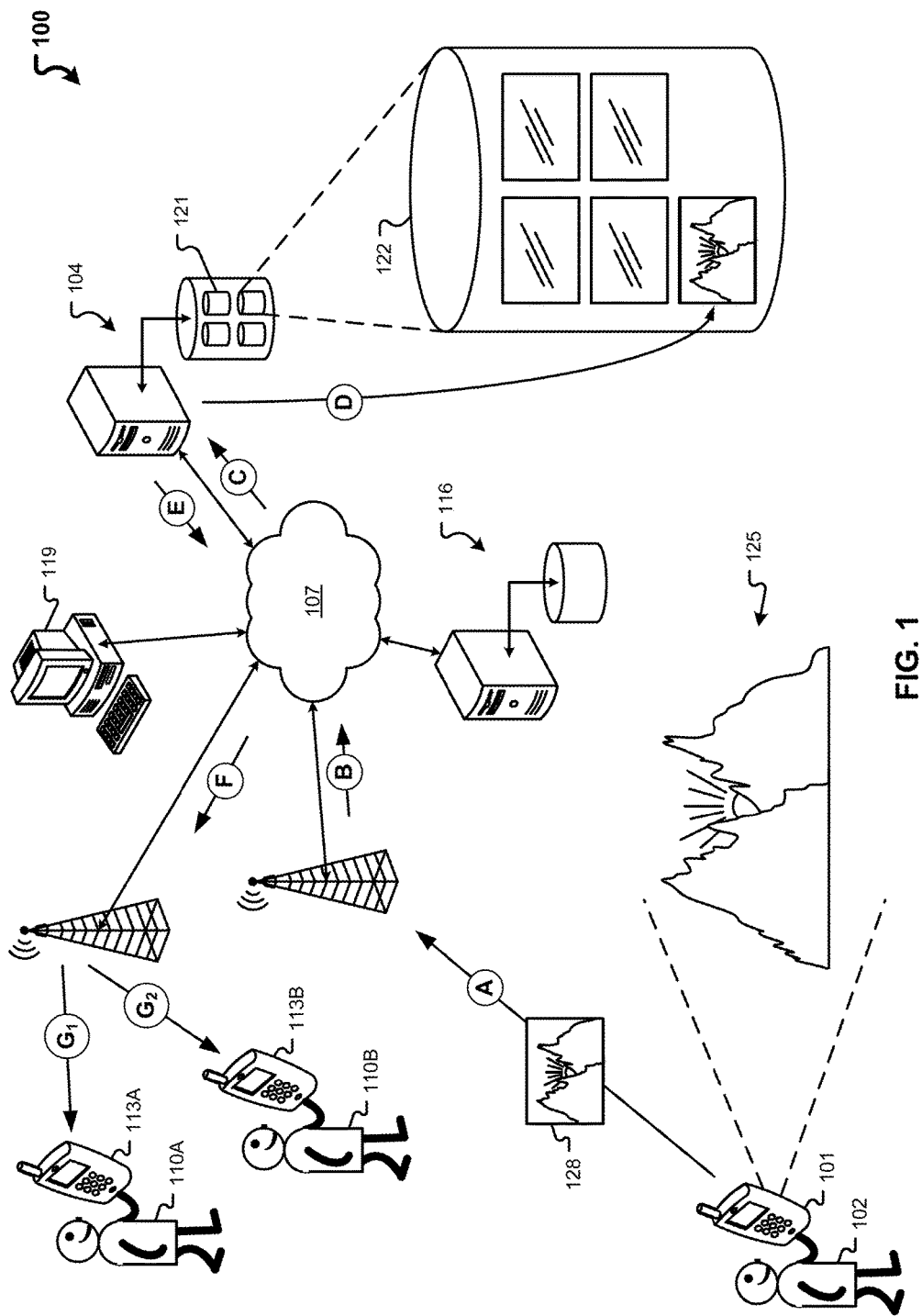
FIG. 1 is a block diagram of an example environment in which media content can be captured by a mobile device and automatically uploaded to an online service provider.

FIG. 1 is a block diagram of an example environment 100 in which media content can be captured by a mobile device 101 and automatically uploaded to an online service provider 104. The mobile device 101 can be any mobile communication or computing device, such as a cell phone, personal digital assistant (PDA), media player, digital camera, digital audio recorder, navigational device, etc. Typically, such devices provide various computing resources that enable a user to interact with the device through input/output facilities, and in particular, to run applications that enable the user to process data or media in some manner. Many such devices include cameras and microphones for capturing various kinds of media content (e.g., audio content, still images, video images, etc.), and some devices may also provide communication facilities, such as voice, data and messaging services. The methods described herein can also be employed by other (non-mobile devices).

In one implementation as shown, the mobile device 101 can connect to a network 107. The network 107 is shown as a single network, but the reader will appreciate that various networks can be included in the network 107, such as, for example, a wireless communication network, the Public Switched Telephone Network (PSTN), the internet, and various other networks (e.g., private networks that are connected to one of the above-mentioned networks).

Through the network, a user 102 of the mobile device 101 can communicate with users 110A and 1108 of other respective mobile devices 113A and 1138. In particular, for example, users 102 and 110A may communicate through a voice connection (e.g., a telephone call) facilitated by the network 107, or a portion thereof. As another example, users 110A and 110B may communicate through text messages, such as electronic mail messages or short message service (SMS) messages that are routed through the network 107, or a portion thereof.

In addition to facilitating communication between users, the network 107 enables the mobile device 101 to access content from content and service providers that are accessible from the network 107. For example, a content provider 116 may provide news and other information to users who connect to the network using mobile devices (e.g., mobile devices 101, 113A or 113B) or other computing devices, such as a computing device 119. The content provider can represent any online content or service provider, such as, for example, CNN, MSNBC, ESPN or GOOGLE. As another example, a service provider 104 may facilitate online communication between many different users, or sharing of media content between users. The service provider 104 can represent any online content or service provider, such as, for example, PICASA™, FLICKR™' PHOTOBUCKET, MYSPACE.COM, or FACEBOOK, to name a few specific examples.

In some implementations, a user of the computing device 119 or the mobile device 101 can manually upload media content to the online service provider 104 (in particular, to storage space associated with an account corresponding to the user). For example, a user of the computing device 119 may store digital pictures on the computing device 119. At some point, the user may desire to upload a portion of the digital pictures to the online service provider 104 (i.e., to storage space 121 associated with the user)—for example, to organize the portion of pictures into albums and share the albums with other specific users who have corresponding accounts on the content provider, or to share the portion of pictures with the general public. In order the upload the portion of pictures, the user may employ an upload tool provided by the online service provider 104 (e.g., an upload application that allows the user to view various digital pictures that are stored on the computing device and individually select pictures for uploading to the service provider).

As another example, a user 102 of the mobile device 101 may take a picture or video using a camera included in the mobile device 101, then subsequently transmit the picture or video to the online service provider 104 (i.e., to an account associated with the user 102, which is depicted by storage space 122, and hereafter referred to as account 122). In particular, for example, the user 102 may email the picture to a specialized inbox maintained by the online service provider 104 for receiving media content.

In some implementations, the process of uploading media content to the online service provider 104 is automated. For example, the user 102 may initially configure the mobile device 101 to identify the online service provider 104, as well as to store, and provide when uploading media content, corresponding account information (e.g., a username and password) for the account 122 that is maintained by the online service provider 104 that corresponds to the user 102. The user 102 may also configure the mobile device 101 with various preferences for uploading media content to the online service provider 104 (e.g., preferences related to types of media content to automatically upload; whether uploaded content is to be made available to the general public, to specific other users or to be maintained as private; whether to send a notification message to any other users once content is uploaded, etc.). Once configured, the mobile device 101 may automatically upload content that is subsequently captured by the mobile device 101.

An example process by which media content can be automatically uploaded to the online service provider 104 is now described in more detail. In this example, the user 102 of the mobile device 101 has previously configured the mobile device 101 to automatically upload digital photos to the account 122, which is maintained by the online service provider 104 (e.g., PICASA™). In the example process, the user 102 employs the mobile device 101 to capture a digital image of a scene 125, using a camera that is included in the mobile device 101. Once a digital image 128 of the scene is captured, the digital image 128 can be automatically uploaded to the online service provider 104. In particular, the digital image 128 can be transmitted to the online service provider 104 via the network 107 (e.g., a wireless communication network and the internet), and in particular, to the user's account 122 (e.g., via paths A, B, C and D).

Identifying information corresponding to the user 102 can also transmitted to the online service provider 104, along with the digital image 128. In some implementations, the identifying information is an account name or number and corresponding login information (e.g., access-control information, such as an account number or username and corresponding password). In other implementations, the identifying information is a device identifier associated with the mobile device 101. For example, during an initial configuration process, the device identifier associated with the mobile device (e.g., a device serial number or other device-specific identifying information) may be associated with the account 122 of the user 102, such that the account 122 can be subsequently accessed using the device identifier. The reader will appreciate that various other kinds of identifying information can be employed, and that in general, any way of securely and uniquely identifying an account can be employed.

The above example may be understood in the context of a packet-switched transmission, in which the digital image 128 is transmitted to the online service provider 104 in one or more packets of information that are individually routed over the network 107 to the online service provider 104. For example, packets carrying portions of the digital image 128 may be transmitted to the online service provider 104 whenever bandwidth is available (e.g., when other wireless functionality of the mobile device 101 is not in use). In some implementations, packets can be transmitted in the background, while other application(s) on the mobile device 101 are in use.

The above example may also be understood in the context of a circuit switched connection between the mobile device 101 and the online service provider 104. For example, the mobile device 101 may open a connection (e.g., a circuit) to the online service provider 104 when the mobile device 101 detects that a camera component (or other media capturing component) has been activated. As part of opening the connection, the mobile device 101 may transmit account identifying information that specifies a destination for subsequently captured media content (e.g., account 122). As media content is captured, the mobile device 101 may then transmit it, over the open connection, to the online service provider 104.

In some implementations, the user 102 may have already captured some media content with the mobile device 101 and stored that media content in the mobile device 101 before configuring the mobile device 101 to automatically upload media content. In such implementations, previously stored media content may also be automatically uploaded. For example, after receiving configuration information to automatically upload captured media content, the mobile device 101 may search its memory, identify media content that is currently stored therein and that has not already been uploaded, and upload the stored media content in the manner described above. Further details of such scenarios are provided with reference to FIG. 4.

Some level of filtering may be applied before media content is automatically uploaded. For example, in some implementations, there is a delay between the media content being captured, and the captured media content being automatically uploaded. Such implementations can account for media content being captured in the mobile device 102 and then being discarded. In particular, for example, if the user 102 of the mobile device 101 captures ten digital images within a short period of time, then deletes six of the captured images shortly after capturing them, only the four digital images that are not deleted may be uploaded. In some implementations, filtering may include identifying certain types of media content to automatically upload. For example, the mobile device 101 may be configured to automatically upload digital images and digital video captured by the mobile device, but not digital audio that is captured by the mobile device.

In some implementations, contents of the mobile device 101 and contents of the corresponding user's account 122 are synchronized. For instance, with reference to the above example in which ten digital images are captured, if the six digital images are deleted after the ten digital images are captured and uploaded (e.g., a day or two later, a week later, etc.), the mobile device 101 may automatically send a command to the online service provider 104 to cause the six images that were deleted on the mobile device 101 to also be deleted from the account 122.

In addition to transmitting to the online service provider 104 media content itself and any identifying information necessary to store the media content in storage associated with a particular user account (e.g., account 122), the mobile device 101 can also transmit to the online service provider information that specifies how the transmitted media content is to be treated—in particular, whether the transmitted media content is to be treated as private content that is available to only the user who captured the content, whether the transmitted media content is to be treated as public (e.g., and made available to the general public by the online service provider 104), whether the transmitted media content is to be treated as semi-public (e.g., and made available to certain other users, such as certain identified users also having accounts with the online service provider).

In some implementations, certain other users are notified when media content is uploaded that meets one or more criteria. One criterion may be that the media that is not identified as private. Another criterion may be that the media is video media having a length within some threshold range (e.g., between 15 and 200 seconds) or a size within some threshold range (e.g., video media that is between 500 kilobytes and 2 megabytes). Another criterion may be that the media is image content having certain metadata (e.g., a captured-date within one week of being uploaded), media that is tagged with particular geo-location information (e.g., GPS coordinates, other geo-coordinates, or more general geographical information, such as "Mt. Rainier"). Any other criteria may be employed to assist a user in filtering uploaded media content about which others are notified. Similarly, any criteria may be employed by other users who subscribe to media content to filter notifications to include only notifications about uploaded content for which the others users may have an interest in obtaining.

To further illustrate, some online services facilitate the creation of social networks (e.g., a network of users, where a first user, such as the user 102, and a second user may be linked by being identified as friends); in such scenarios, users within a social network (e.g., friends who are linked to each other within some degree (e.g., direct, mutually linked friends (first degree); friends of friends (second-degree connection), friends of friends of friends (third degree connection), etc.) may be notified each time a user's media content is uploaded (or each a time a user's media that meets appropriate criteria is uploaded). In particular, for example, the online service provider may be configured to send an SMS or email message to other users in the social network whenever media content is uploaded for the user 102.

As another notification example, some online services facilitate subscriptions, whereby users can sign up to receive (subscribe to) notifications of new content available from other users, or to receive the content itself (e.g., via email or in a special message box provided the online service provider). In such scenarios, users who have subscribed to content available from the user 102 can receive an SMS or email message whenever media content from the user 102 is uploaded.

In the above examples in which other users are notified when a user's media content is uploaded from the mobile device 101, messages to the other users may, in some implementations, come from the online service provider 104. For purposes of this example, the other users can include the users 110A and 1106. In particular, for example, the online service provider may send SMS messages (or other types of messages) to the users 110A and 1106 (via paths E, F and G$_1$ and G$_2$) based on configuration information associated with the user account 122 (e.g., configuration information identifying users 110A and 1106 as friends of the user 102, or other users who have subscribed to content of the user 102). Alternatively, if the users 110A and 1106 also have accounts with the online service provider 104, messages may be placed in a message area (e.g., an inbox) associated with those users' accounts. The messages may include a link to the new content to enable the users 110A and 1106 to efficiently access that new content.

In other implementations, the users 110A and 1106 may be directly notified of new media content by the mobile device 101 rather than by the online service provider 104. That is, as (or after) new media content is automatically uploaded from the mobile device 101 to the online service provider 104, the mobile device 101 may automatically send SMS messages (or other types of messages) to the users 110A and 110b alerting them that new content is available from the user 102.

In order to ensure that the content is actually available from the online service provider, there may be some delay between the time the content is uploaded from the mobile device 101 and the time the messages are sent to the users 110A and 110b. In particular, for example, the mobile device 101 may be configured to wait a predetermined period of time (e.g., 30 seconds, one minute, ten minutes, four hours, etc.) after uploading new media content before notifying the users 110A and 110b; alternatively, the mobile device 101 may receive a confirmation message from the online service provider 104 once the media content has been successfully received, and the mobile device 101 may wait until receiving the confirmation message before notifying the users 110A and 110b of the new content. In some implementations, a confirmation message includes a direct link to the newly uploaded content, and the mobile device 101 may provide the direct link in notification messages to the users 110A and 110b to enable the users to quickly navigate to the new content.

Figure 2:
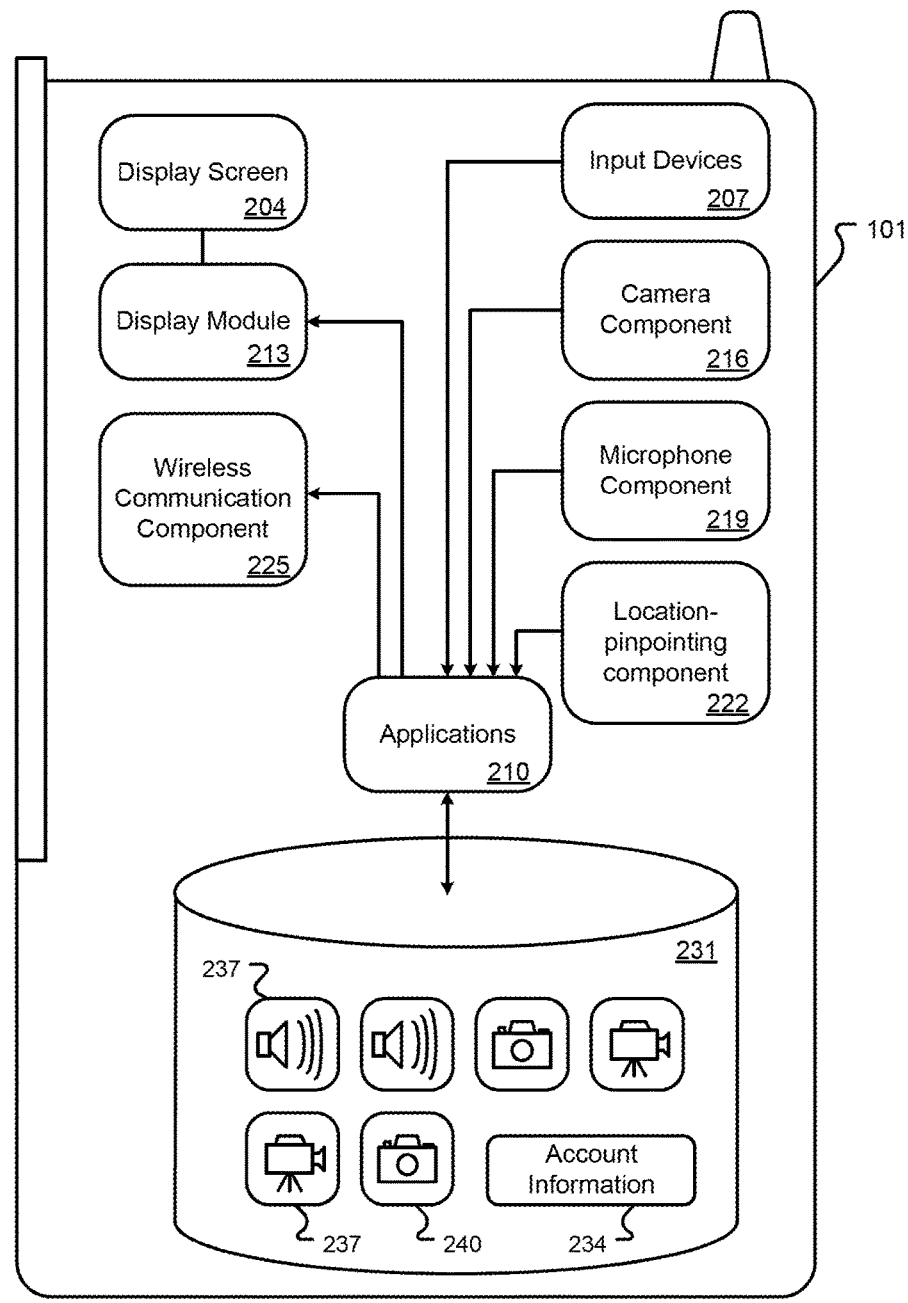
FIG. 2 is block diagram illustrating additional example details of the mobile device shown in FIG. 1.

FIG. 2 is block diagram illustrating additional example details of the mobile device 101 shown in FIG. 1. Other details of mobile devices that can implement the methods described herein are illustrated in and described with reference to FIGS. 6-10.

As depicted in one implementation in FIG. 2, the mobile device 101 includes a display screen 204 (and possibly other output devices, which are not shown), input devices 207 (e.g., buttons, a hard keyboard, a soft keyboard (such as an image of a keyboard on a touch-sensitive screen, etc.), and applications 210 (e.g., programming code stored in memory that can be executed by a processor to receive input from the input devices 207, process the input and present corresponding output in the display screen 204 or through other output devices).

A display module 213 can include programming code and hardware necessary to receive information from the applications 210 and from other sources, transform the information into a format that is suitable for controlling the display screen (e.g., a pixel format that specifies data for each pixel in the display screen including, for example, a row and column address, a color for the pixel, and an intensity for the pixel), and provide the transformed information to the display screen 204 (or more particularly, a hardware interface that controls the display screen, in some implementations).

Other types of input devices can also be included, such as media-capturing devices that can include a camera component 216, a microphone component 219; and a location-pinpointing component 222. The camera component 216 can be a still-image or video-image capturing device for capturing image data. The microphone component 219 can be a microphone element for capturing audio data.

The location-pinpointing component 222 can be a component configured to identify a current location of the mobile device 101. For example, in some implementations, the location-pinpointing component 222 is a Global Positioning System (GPS) component that can capture current latitude and longitude information and, optionally, altitude information of the mobile device 101 (e.g., using signals from multiple GPS satellites). As another example, the location-pinpointing component can be a component that captures location information in another manner, such as a component that receives triangulation-based information from a corresponding wireless network, or a component that directly determines a location relative to nearby wireless towers, based on signals that are transmitted from those towers (e.g., using triangulation or other suitable techniques). The location-pinpointing component 222 can employ other methods of determining a current location of the mobile device—some of which are described in more detail below with reference to FIG. 7.

Some applications can provide messaging functionality (e.g., SMS or email applications). In order for such applications to exchange messages with external devices, through an external network, the mobile device 101 can include a wireless communication component 225. Wireless communication functionality is described in greater detail below—for example, with reference to FIGS. 6 and 7.

As depicted in one implementation, the mobile device 101 includes data storage component 231 (e.g., memory) that can provide storage for various application data. In particular, in the context of capturing and uploading media content, the mobile device 101 can include storage 231 for storing account information 234 associated with a user account maintained by an online service provider (e.g., the user account 122 maintained by the online service provider 104 for the user 102—shown in FIG. 1). In addition, media content can be saved in the storage 231 after being captured (e.g., an audio file, depicted, for example, by element 237; a video file, depicted, for example, by element 240; and still-image file, depicted, for example, by element 243).

As described in greater detail with reference to FIG. 3, a user of the mobile device 101 can capture media content using the camera component 216 or the microphone component 219; captured media content can be stored in the data storage component 231 (e.g., as a video file 240, an image file 243 or an audio file 237); and an application (e.g., one of the applications 210) can automatically upload the stored media content and account information 234 to an online service provider, using the wireless communication component 225.

Two example media capturing components 216 and 219 are shown in FIG. 2, but the reader will appreciate that the mobile device 101 can include various other media-capturing components for capturing other kinds of media. For example a GPS receiver (or another type of receiver capable of capturing geographical information corresponding to a current location of the mobile device 101) can capture route information (e.g., a route including a series of geographical locations over which the mobile device 101 traverses). In some implementations, partial route information is periodically uploaded as the route is traversed; in other implementations, data for an entire route can be automatically uploaded when a user indicates that the route is complete (e.g., by providing input to a route-capturing application). As other examples, other media-capturing components can capture other kinds of media, such as, for example, audio content, video content, acceleration or vibration content, temperature content, humidity content, barometric pressure content (or other weather condition-related content), content that includes non-visible portions of the electromagnetic spectrum (e.g., x-rays, infrared, ultra high frequency content, etc.), and other kinds of content that can be captured by an input device included in the mobile device 101 and stored electronically. Moreover, multimedia content can also be captured and automatically uploaded.

Figure 3:
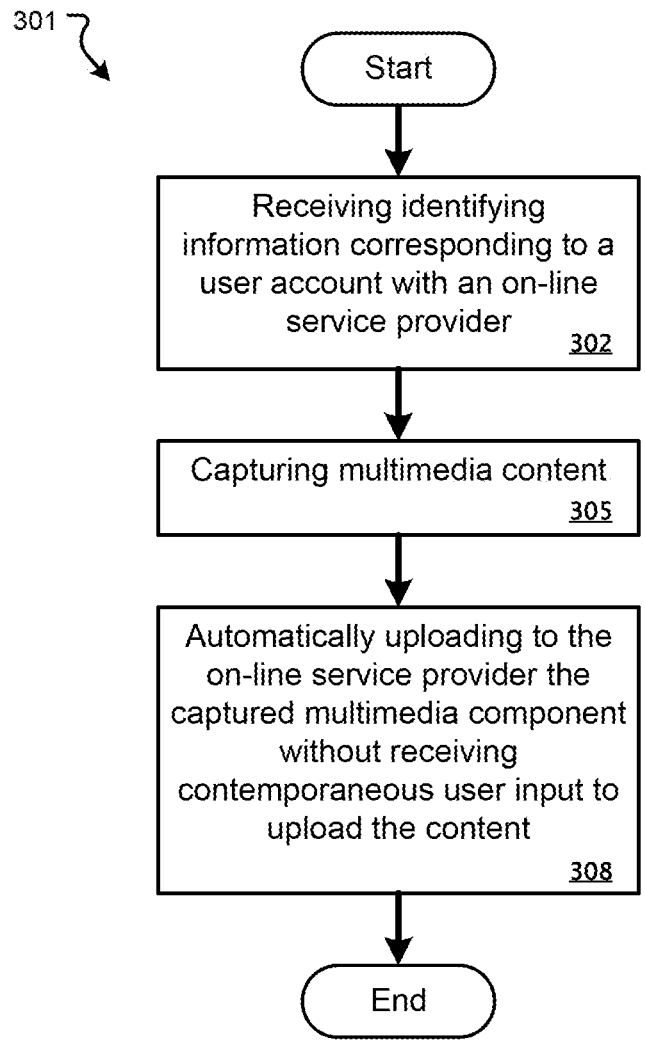
FIG. 3 is a flow diagram of an example method of capturing, and automatically uploading to an online service provider, media content

FIG. 3 is a flow diagram of an example method 301 of capturing, and automatically uploading to an online service provider, media content. The method 301 can be carried out, for example, by the mobile device 101 shown in FIGS. 1 and 2. As shown, the method 301 can include receiving (302) identifying information corresponding to a user account associated with an online service provider. For example, with reference to FIG. 1, the mobile device 101 can receive input from the user 102 that identifies the account 122 (e.g., the account information 234 shown in FIG. 2). In particular, the account-identifying information can include an identifier for the appropriate online service provider (e.g., PICASA™), as well as, for example, login and password information to enable the user 102 to access the account (e.g., in subsequent transactions, such as subsequent uploads of media content). In some implementations, the mobile device 101 receives (302) this information in a configuration interface, such as that shown in FIG. 4.

The method 301 can also include capturing (305) media content. For example, with reference to FIGS. 1 and 2, the user 102 can employ the mobile device 101 to capture a digital image of the scene 125. In particular, the user 102 can employ a camera component (e.g., camera component 216, shown in FIG. 2, and a corresponding image-capturing application included in the applications 210) to capture the digital image. Upon capturing the digital image, the mobile device 101 may store the digital image in memory included in the mobile device (e.g., the digital image may be stored as the file 240, in a data storage area of memory, depicted as element 231).

The method 301 includes automatically uploading (308) to the online service provider the captured media content without receiving contemporaneous user input to upload the captured media content. In this context, contemporaneous input can include input that is received shortly before (e.g., a second before, several seconds before, one or more minutes before) the media content is uploaded. In contrast, automatically uploading media content without receiving contemporaneous user input to upload the captured media content can include, for example, automatically uploading media content based on configuration information that was received (302) five minutes before the media content is automatically uploaded, 30 minutes before the media content is automatically uploaded, two days before the media content is uploaded, six months before the media content is automatically uploaded, etc. That is, the media content can be uploaded in response to configuration information that was previously received (302) by the mobile device, but specific instances of media can be automatically uploaded based on general configuration settings, rather than in response to direct, contemporaneous user input that is particular to the specific instances of media.

To further illustrate with continued reference to FIGS. 1 and 2, after the user 102 has captured the digital image of the scene 125 (e.g., the electronic file depicted as element 240), one of the applications 210 can cause captured media content (e.g., the file 240) and account-identifying information (e.g., account information 234) to be transmitted by the wireless communication component 225. In particular, the wireless communication component 225 can cause the captured media content and the account-identifying information 234 to be transmitted to the online service provider 104 (e.g., via the network 107, along paths A, B, C and D).

In some implementations, other information associated with the captured content can also be transmitted to the online service provider 104. For example, as described above, configuration preferences regarding how the captured media is to be treated (e.g., as publicly available media, as private media, as semi-private media, etc.) can also be transmitted with the captured media. As another example, some implementations may also include geographical information associated with the captured media. In particular, the location-pinpointing component 222, shown in FIG. 2, can capture location information of the mobile device 101 any time media content is captured. Such location information can be stored with the captured media content and transmitted to the online service provider with the content itself (e.g., to enable the media content to be geotagged or geocoded). Other metadata or information can also be provided with the media content (e.g., a size of the media content, a resolution, a file format, a timestamp corresponding to when the media content was captured, etc.).

In some implementations, as described above, messages (e.g., SMS or email messages) may be sent to various other users alerting the other users that new media content from the user 102 has been uploaded. The messages could be sent from the mobile device 101 or from the online service provider 104. In addition, a confirmation message may be sent from the online service provider to the mobile device 101 to alert the user 102 that media content has been successfully uploaded.

Figure 4:
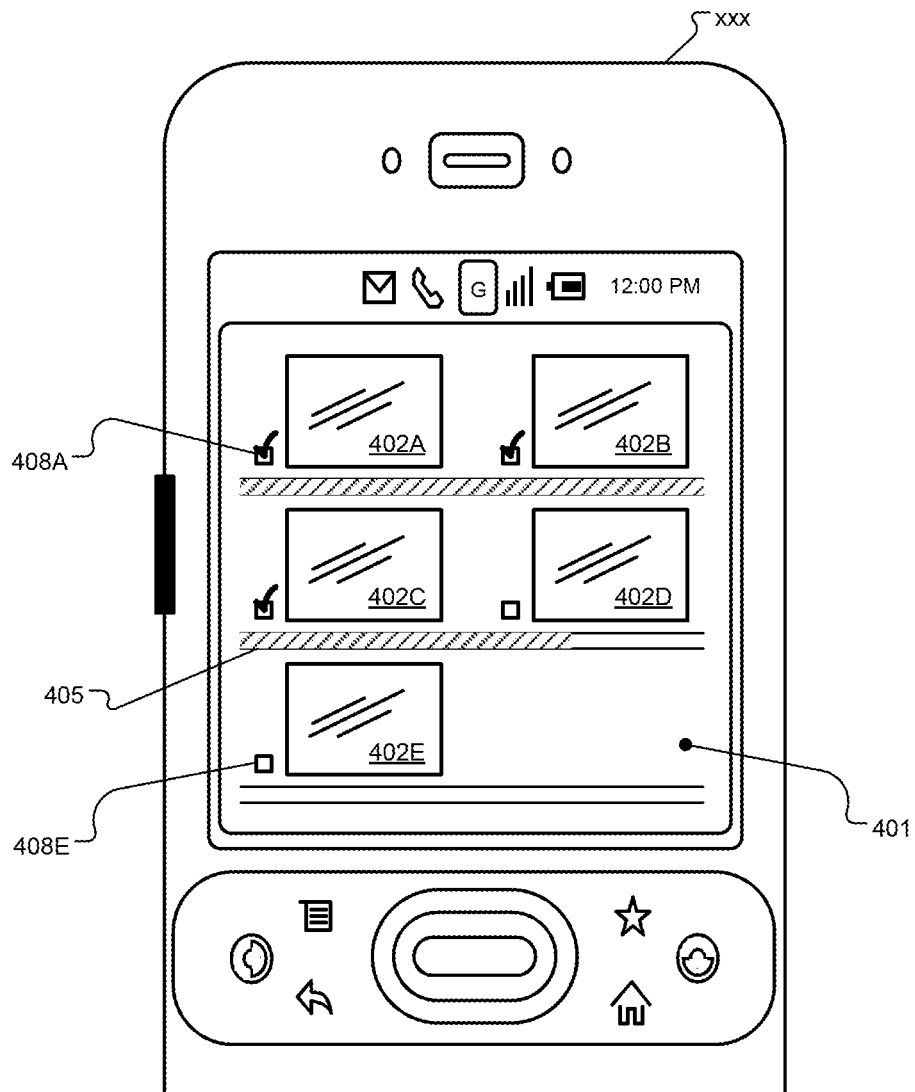
FIG. 4 is an example screenshot illustrating a graphical summary of progress of an automatic upload process of media from a mobile device to an online service provider.

FIG. 4 is an example screenshot illustrating a graphical summary 401 of progress of an automatic upload process of media from the mobile device 101 to an online service provider. For purposes of example, the example media content is depicted as including five digital images, but the graphical summary 401 can provide status information for any other kind of media.

As shown in one implementation, the graphical summary 401 can include a thumbnail for each digital image that is being automatically uploaded (e.g., thumbnails 402A, 402B, 402C, 402D and 402E). The graphical summary 401 can include a progress bar 405 that may be filled in as media content is uploaded. A checkbox can also be displayed next to each thumbnail, and the checkbox can be either checked (e.g., as checkbox 405A is) or unchecked (as checkbox 405E is)—for example, depending on whether the corresponding media (e.g., digital image) has been fully uploaded to the appropriate online service provider.

The graphical summary 401 can provide status to the user which may be useful when the media content is large (in which case, some time and network bandwidth may be required to upload the media content). In addition, when multiple different media files are uploaded, the graphical summary 401 can provide the user with status information regarding specific media files. For example, as depicted in FIG. 4, the graphical summary may indicate to a user that media file 402A has been fully uploaded, media file 402D is currently being uploaded, and medial file 402E has not yet been uploaded.

The information in the graphical summary 401 may serve as confirmation to a user that his or her content has been uploaded, or the information may enable the user to take other actions. For example, a user may wish to directly notify certain friends by email once specific media content has been uploaded, and the graphical summary 401 may provide confirmation information to which the user can refer in order to know when to send the email. This feature may be particularly advantageous, for example, when the user desires to notify other people that specific content has been uploaded when the other people are not configured to be automatically notified (e.g., by the mobile device or by the online service provider with an SMS message).

The graphical summary 401 may be useful in other situations as well. For example, if the user has captured media content before configuring his or her mobile device 101 to automatically upload media content to an online service provider when it is captured, an automatic upload application may give the user an option to manually select already captured media content to initially upload to the online service provider from an interface such as the graphical summary 401. In such implementations, the user may employ the illustrated checkboxes (e.g., checkboxes 408A and 408E) to indicate which already captured media content should be initially uploaded.

The graphical summary 401 is merely exemplary, and the reader will appreciate that various other graphical or textual status information may be provided for various purposes, such as controlling the upload process or providing status regarding the same. For example, a column could be added to screens that provide information about files stored in the mobile device 101 (e.g., file browser screens), and each row corresponding to a file that has been uploaded to the online service provider could include an icon or special text (e.g., a check mark or some other indicator). Other formats and status information is contemplated.

Figure 5:
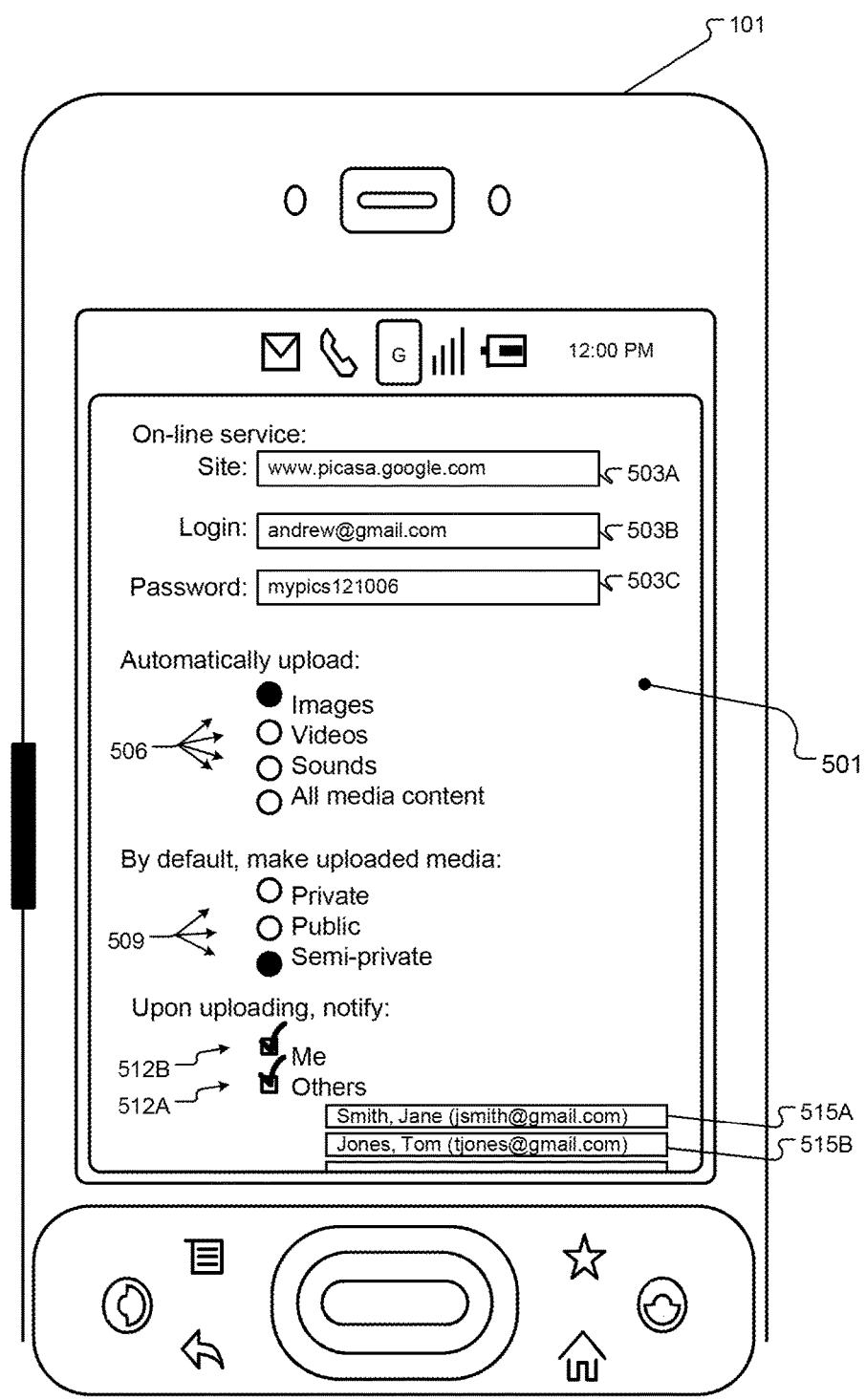
FIG. 5 is a screenshot illustrating an example configuration tool for configuring how captured media content is to be automatically uploaded to an online service provider.

FIG. 5 is a screenshot illustrating an example configuration tool 501 for configuring how captured media content is to be automatically uploaded to an online service provider. As depicted in one implementation, the configuration tool 501 can enable a user to specify an online service provider (e.g., the online service provider 104 that is shown in FIG. 1), as well as a corresponding login or username and password (e.g., by providing respective data entry fields 503A, 503B, and 503C). In addition, the configuration tool 501 can enable a user to specify types of media content that should be automatically uploaded (e.g., images, video or sounds, to name a few examples) by providing radio buttons 506, and to configure whether uploaded content should be classified as private, public or semi-private (e.g., made accessible to a select group of users) by providing radio buttons 509.

For semi-private or private content, the configuration tool 501 can also enable the user to configure whether a message should be sent to certain other users (e.g., designated friends of the user who have access to semi-private content, users who have subscribed to public content, etc.) by providing a checkbox 512A, and can further enable the user to identify the certain other users (e.g., with data entry fields 515A and 515B in which the other users' content information, such as email addresses, can be included). Another checkbox 512B may be provided to configure whether a confirmation message should be sent back to the user once media content has been successfully received by the online service provider.

The configuration tool 501 shown in FIG. 5 is merely exemplary. For purposes of example, various checkboxes, radio buttons, and data entry fields are shown, but any suitable means for gathering relevant user input can be employed. In addition, other information can be gathered, which the mobile device can use in determining whether and how to automatically upload media content, and whether to notify certain users once the media content has been uploaded. For example, in some implementations, a user-specified time period may be entered, specifying how long the mobile device 101 should wait before automatically uploading media content. If media content is captured and deleted within the user-specified time period of being captured, the media content may not be uploaded. Such a feature may be advantageous, for example, to users who frequently take multiple digital pictures, then delete several of the pictures and save only those that turn out best. In such scenarios, the user may not want the subsequently deleted pictures to be uploaded, and a user-specified delay period may ensure that the undesired pictures are not uploaded. Various other kinds of configuration information are contemplated. As another example, the configuration tool can be configured to query the user about whether to upload any available geographical information associated with the media content (e.g., with an "Include geo-information" checkbox).

Information gathered in a configuration tool such as the one 501 shown in FIG. 5 can be used to provide default handling settings for media content. In some implementations, the default handling settings can be overridden on a media or media instance-specific basis. For example, the mobile device 501 may display a text box (not shown in the figures) requesting user confirmation of whether to apply or override default handling information on a media-specific basis (e.g., anytime video content is captured). As another example, a screen such as the summary screen 401 shown in FIG. 4 may enable a user to specifically confirm that certain media content instances should be uploaded according to the default handling information.

Figure 6:
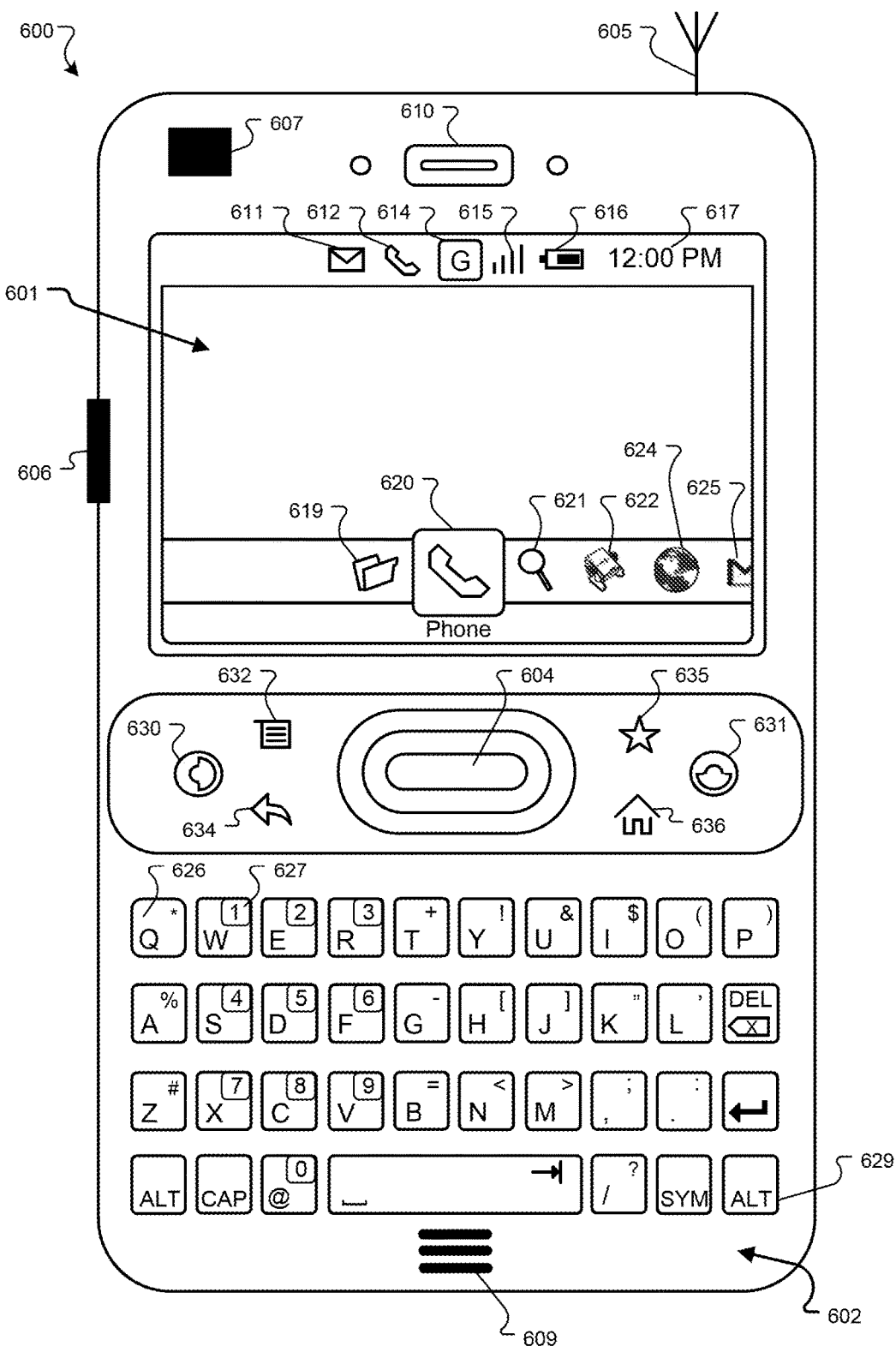
FIG. 6 is a schematic representation of an exemplary mobile device that can automatically upload media content to an online service provider.

Referring now to FIG. 6, the exterior appearance of an exemplary device 600 that facilitates automatic uploading of media content is illustrated. Briefly, and among other things, the device 600 includes a processor configured to provide interactive indicators, which can reveal progressively more information about an alert message, in response to user interaction with the corresponding interactive indicator.

In more detail, the hardware environment of the device 600 includes a display 601 for displaying text, images, and video to a user; a keyboard 602 for entering text data and user commands into the device 600; a pointing device 604 for pointing, selecting, and adjusting objects displayed on the display 601; an antenna 605; a network connection 606; a camera 607 (which can be employed to capture digital image or video media that can be automatically uploaded to an online service provider); a microphone 609 (which can be employed to capture audio media that can be automatically uploaded to an online service provider); and a speaker 610. Although the device 600 shows an external antenna, the device 600 can include an internal antenna, which is not visible to the user.

The display 601 can display video, graphics, images, and text that make up the user interface for the software applications used by the device 600, and the operating system programs used to operate the device 600. Possible elements that may be displayed on the display 601 include, for example, a new mail indicator 611 that alerts a user to the presence of a new message; an active call indicator 612 that indicates that a telephone call is being received, placed, or is occurring; a data standard indicator 614 that indicates the data standard currently being used by the device 600 to transmit and receive data; a signal strength indicator 615 that indicates a measurement of the strength of a signal received by via the antenna 605, such as by using signal strength bars; a battery life indicator 616 that indicates a measurement of the remaining battery life; or a clock 617 that outputs the current time.

The display 601 may also show application icons representing various applications available to the user, such as a web browser application icon 619, a phone application icon 620, a search application icon 621, a contacts application icon 622, a mapping application icon 624, an email application icon 625, or other application icons. In one example implementation, the display 601 is a quarter video graphics array (QVGA) thin film transistor (TFT) liquid crystal display (LCD), capable of 16-bit color or better.

A user uses the keyboard (or "keypad") 602 to enter commands and data to operate and control the operating system and applications. The keyboard 602 includes standard keyboard buttons or keys associated with alphanumeric characters, such as keys 626 and 627 that are associated with the alphanumeric characters "Q" and "W" when selected alone, or are associated with the characters "*" and "1" when pressed in combination with key 629. A single key may also be associated with special characters or functions, including unlabeled functions, based upon the state of the operating system or applications invoked by the operating system. For example, when an application calls for the input of a numeric character, a selection of the key 627 alone may cause a "1" to be input.

In addition to keys traditionally associated with an alphanumeric keypad, the keyboard 602 also includes other special function keys, such as an establish-call key 630 that causes a received call to be answered or a new call to be originated; a terminate call key 631 that causes the termination of an active call; a drop down menu key 632 that causes a menu to appear within the display 601; a backwards navigation key 634 that causes a previously accessed network address to be accessed again; a favorites key 635 that causes an active web page to be placed in a bookmarks folder of favorite sites, or causes a bookmarks folder to appear; a home page key 636 that causes an application invoked on the device 600 to navigate to a predetermined network address; or other keys that provide for multiple-way navigation, application selection, and power and volume control.

The user uses the pointing device 604 to select and adjust graphics and text objects displayed on the display 601 as part of the interaction with and control of the device 600 and the applications invoked on the device 600. The pointing device 604 is any appropriate type of pointing device, and may be a joystick, a trackball, a touch-pad, a camera, a voice input device, a touch screen device implemented in combination with the display 601, or any other input device.

The antenna 605, which can be an external antenna or an internal antenna, is a directional or omni-directional antenna used for the transmission and reception of radiofrequency (RF) signals that implement point-to-point radio communication, wireless local area network (LAN) communication, or location determination. The antenna 605 may facilitate point-to-point radio communication using the Specialized Mobile Radio (SMR), cellular, or Personal Communication Service (PCS) frequency bands, and may implement the transmission of data using any number or data standards. For example, the antenna 605 may allow data to be transmitted between the device 600 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Media Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 606 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 606 may connect to a LAN network, a corporate or government WAN network, the Internet, a telephone network, or other network. The network connection 606 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 606 and the antenna 605 are integrated into a single component.

The camera 607 allows the device 600 to capture digital images, and may be a scanner, a digital still camera, a digital video camera, other digital input device. In one example implementation, the camera 607 is a 3 mega-pixel (MP) camera that utilizes a complementary metal-oxide semiconductor (CMOS). As indicated above, some media content captured by the camera 607 can be automatically uploaded to an online service provider, as described herein.

The microphone 609 allows the device 600 to capture sound, and may be an omni-directional microphone, a unidirectional microphone, a bi-directional microphone, a shotgun microphone, or other type of apparatus that converts sound to an electrical signal. The microphone 609 may be used to capture sound generated by a user, for example when the user is speaking to another user during a telephone call via the device 600, or in other circumstances. As indicated above, some audio content captured by the microphone 609 can be automatically uploaded to an online service provider.

The speaker 610 allows the device to convert an electrical signal into sound, such as a voice from another user generated by a telephone application program, or a ring tone generated from a ring tone application program. Furthermore, although the device 600 is illustrated in FIG. 6 as a handheld device, in further implementations the device 600 may be a laptop, a workstation, a midrange computer, a mainframe, an embedded system, telephone, desktop PC, a tablet computer, a PDA, or other type of computing device.

Figure 7:
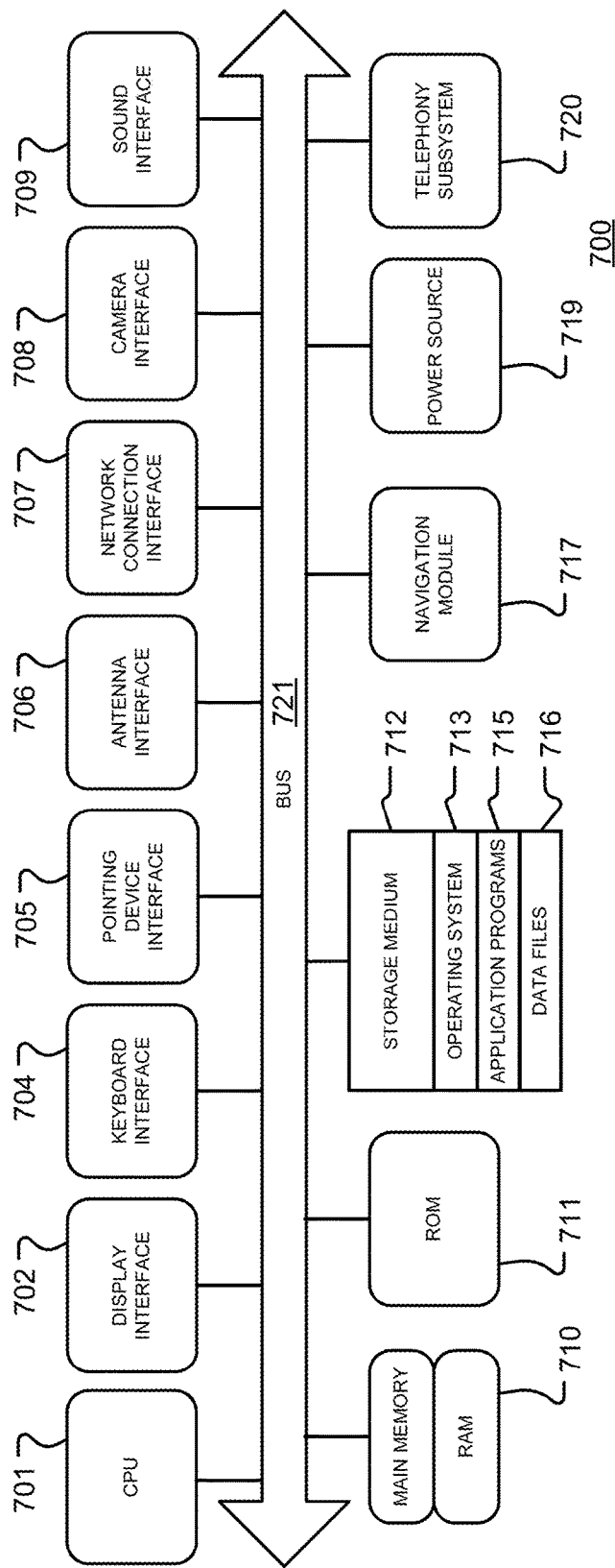
FIG. 7 is a block diagram illustrating additional details of the internal architecture of the device of FIG. 6.

FIG. 7 is a block diagram illustrating an internal architecture 700 of the device 600. The architecture includes a central processing unit (CPU) 701 where the computer instructions that comprise an operating system or an application are processed; a display interface 702 that provides a communication interface and processing functions for rendering video, graphics, images, and texts on the display 601, provides a set of built-in controls (such as buttons, text and lists), and supports diverse screen sizes; a keyboard interface 704 that provides a communication interface to the keyboard 602; a pointing device interface 705 that provides a communication interface to the pointing device 604; an antenna interface 706 that provides a communication interface to the antenna 605; a network connection interface 707 that provides a communication interface to a network over the computer network connection 606; a camera interface 708 that provides a communication interface and processing functions for capturing digital images from the camera 607; a sound interface 709 that provides a communication interface for converting sound into electrical signals using the microphone 609 and for converting electrical signals into sound using the speaker 610; a random access memory (RAM) 710 where computer instructions and data are stored in a volatile memory device for processing by the CPU 701; a read-only memory (ROM) 711 where invariant low-level systems code or data for basic system functions such as basic input and output (I/O), startup, or reception of keystrokes from the keyboard 602 are stored in a non-volatile memory device; a storage medium 712 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 713, application programs 715 (including, for example, a web browser application, a widget or gadget engine, and/or other applications, as necessary, and further including an application for automatically uploading media content, such as an automatic upload management component) and data files 716 are stored; a navigation module 717 that provides a real-world or relative position or geographic location of the device 600; a power source 719 that provides an appropriate alternating current (AC) or direct current (DC) to power components; and a telephony subsystem 720 that allows the device 600 to transmit and receive sound over a telephone network. The constituent devices and the CPU 701 communicate with each other over a bus 721.

The CPU 701 can be one of a number of computer processors. In one arrangement, the computer CPU 701 is more than one processing unit. The RAM 710 interfaces with the computer bus 721 so as to provide quick RAM storage to the CPU 701 during the execution of software programs such as the operating system application programs, and device drivers. More specifically, the CPU 701 loads computer-executable process steps from the storage medium 712 or other media into a field of the RAM 710 in order to execute software programs. Data is stored in the RAM 710, where the data is accessed by the computer CPU 701 during execution. In one example configuration, the device 600 includes at least 128 MB of RAM, and 256 MB of flash memory.

The storage medium 712 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 600 to access computer-executable process steps, application programs and the like, stored on removable and non-removable memory media, to off-load data from the device 600, or to upload data onto the device 600.

A computer program product is tangibly embodied in storage medium 712, a machine-readable storage medium. The computer program product includes instructions that, when read by a machine, operate to cause a data processing apparatus to store image data in the mobile device. In some implementations, the computer program product includes instructions that automatically upload media content to one or more online service providers.

The operating system 713 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 713 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 713, and the application programs 715 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 715 may also include a widget or gadget engine, such as a TAFRI™ widget engine, a MICROSOFT gadget engine such as the WINDOWS SIDEBAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

Although it is possible for automatic uploading of media content to be provided using the above-described implementation, it may also be possible to implement the functions described herein as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 717 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 717 may also be used to measure angular displacement, orientation, or velocity of the device 600, such as by using one or more accelerometers.

Figure 8:
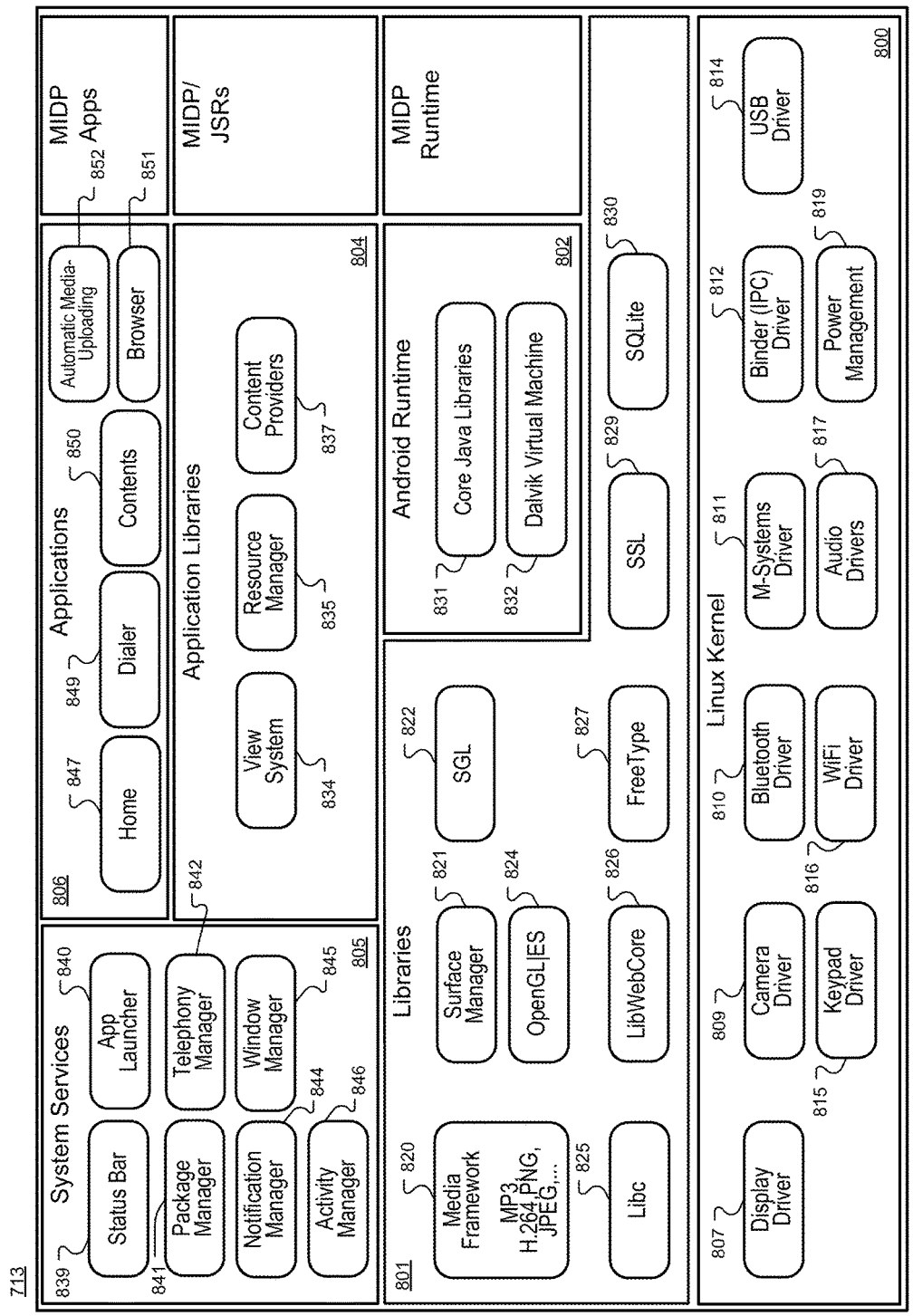
FIG. 8 is a block diagram illustrating exemplary components of the operating system used by the device of FIG. 6.

FIG. 8 is a block diagram illustrating exemplary components of the operating system 713 used by a device, in the case where the operating system 713 is the GOOGLE mobile device platform. The operating system 713 invokes multiple processes, while ensuring that the associated phone application is responsive, and that wayward applications do not cause a fault (or crash) of the operating system. Using task switching, the operating system 713 allows for the switching of applications while on a telephone call, without losing the state of each associated application. The operating system 713 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

In some implementations, the operating system 713 is organized into six components: a kernel 800, libraries 801, an operating system runtime 802, application libraries 804, system services 805, and applications 806. The kernel 800 includes a display driver 807 that allows software such as the operating system 713 and the application programs 715 to interact with the display 601 via the display interface 702, a camera driver 809 that allows the software to interact with the camera 607; a BLUETOOTH driver 810; an M-Systems driver 811; a binder (IPC) driver 812, a USB driver 814 a keypad driver 815 that allows the software to interact with the keyboard 602 via the keyboard interface 704; a WiFi driver 816; audio drivers 817 that allow the software to interact with the microphone 609 and the speaker 610 via the sound interface 709; and a power management component 819 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 801 include a media framework 820 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 821; a simple graphics library (SGL) 822 for two-dimensional application drawing; an Open Graphics Library for Embedded Systems (OpenGL ES) 824 for gaming and three-dimensional rendering; a C standard library (LIBC) 825; a LIBWEBCORE library 826; a FreeType library 827; an SSL 829; and an SQLite library 830.

The operating system runtime 802 includes core JAVA libraries 831, and a Dalvik virtual machine 832. The Dalvik virtual machine 832 is a custom virtual machine that runs a customized file format (.DEX).

The operating system 713 can also include Mobile Information Device Profile (MIDP) components, such as MIDP JAVA Specification Requests (JSRs) components, MIDP runtime, and MIDP applications, as shown in FIG. 7. The MIDP components can support MIDP applications running on the device 600.

With regard to graphics rendering, a system-wide composer manages surfaces and a frame buffer and handles window transitions, using the OpenGL ES 824 and two-dimensional hardware accelerators for its compositions.

The Dalvik virtual machine 832 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 804 include a view system 834, a resource manager 835, and content providers 837. The system services 805 includes a status bar 839; an application launcher 840; a package manager 841 that maintains information for all installed applications; a telephony manager 842 that provides an application level JAVA interface to the telephony subsystem 820; a notification manager 844 that allows all applications access to the status bar and on-screen notifications; a window manager 845 that allows multiple applications with multiple windows to share the display 601; and an activity manager 846 that runs each application in a separate process, manages an application life cycle, and maintains a cross-application history.

The applications 806 include a home application 847, a dialer application 849, a contacts application 850, a browser application 851, and an automatic media uploading application 852.

The telephony manager 842 provides event notifications (such as phone state, network state, Subscriber Identity Module (SIM) status, or voicemail status, allows access to state information (such as network information, SIM information, or voicemail presence), initiates calls, and queries and controls the call state. The browser application 851 renders web pages in a full, desktop-like manager, including navigation functions. Furthermore, the browser application 851 allows single column, small screen rendering, and provides for the embedding of HTML views into other applications.

Figure 9:
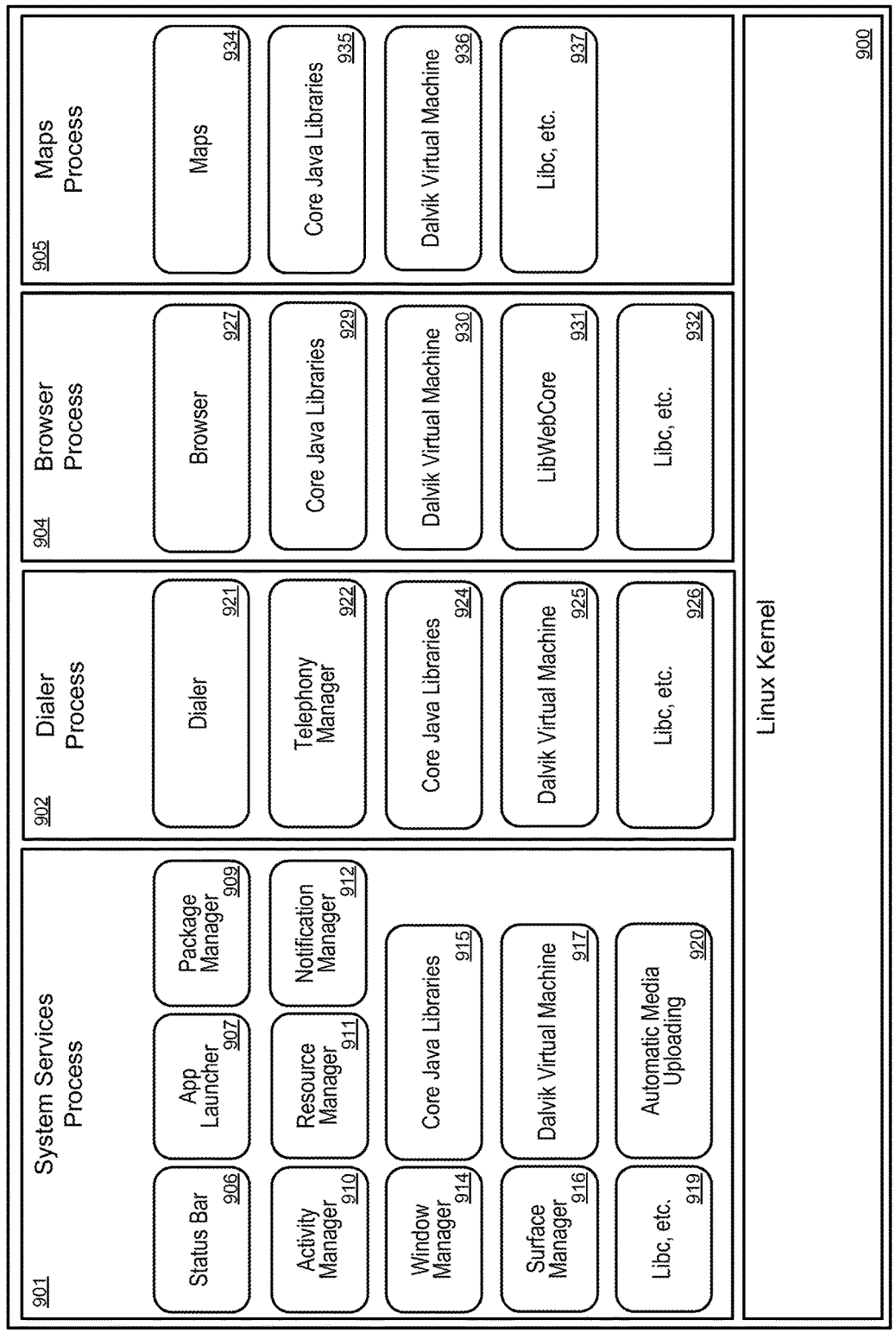
FIG. 9 is a block diagram illustrating exemplary processes implemented by the operating system of FIG. 8.

FIG. 9 is a block diagram illustrating exemplary processes implemented by the operating system kernel 900. Generally, applications and system services run in separate processes, where the activity manager 910 runs each application in a separate process and manages the application life cycle. The applications run in their own processes, although many activities or services can also run in the same process.

Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components, such as the surface manager 916, the window manager 914, or the activity manager 910 can be continuously executed while the device 600 is powered. Additionally, some application-specific processes can also be persistent. For example, processes associated with the dialer application 921, may also be persistent.

The processes implemented by the operating system kernel 900 may generally be categorized as system services processes 901, dialer processes 902, browser processes 904, and maps processes 905.

The system services processes 901 include status bar processes 906 associated with the status bar 839; application launcher processes 907 associated with the application launcher 840; package manager processes 909 associated with the package manager 841; activity manager processes 910 associated with the activity manager 846; resource manager processes 911 associated with a resource manager 835 that provides access to graphics, localized strings, and XML layout descriptions; notification manger processes 912 associated with the notification manager 844; window manager processes 914 associated with the window manager 845; core JAVA libraries processes 915 associated with the core JAVA libraries 831; surface manager processes 916 associated with the surface manager 821; Dalvik virtual machine processes 917 associated with the Dalvik virtual machine 832; LIBC processes 919 associated with the LIBC library 825; and automatic media uploading process 920 associated with the automatic media uploading application 852 (e.g., an automatic upload management component).

The dialer processes 902 include dialer application processes 921 associated with the dialer application 849; telephony manager processes 922 associated with the telephony manager 842; core JAVA libraries processes 924 associated with the core JAVA libraries 831; Dalvik virtual machine processes 925 associated with the Dalvik Virtual machine 832; and LIBC processes 926 associated with the LIBC library 825.

The browser processes 904 include browser application processes 927 associated with the browser application 851; core JAVA libraries processes 929 associated with the core JAVA libraries 831; Dalvik virtual machine processes 930 associated with the Dalvik virtual machine 832; LIBWEB-CORE processes 931 associated with the LIBWEBCORE library 826; and LIBC processes 932 associated with the LIBC library 825.

The maps processes 905 include maps application processes 934, core JAVA libraries processes 935, Dalvik virtual machine processes 936, and LIBC processes 937. Notably, some processes, such as the Dalvik virtual machine processes, may exist within one or more of the systems services processes 901, the dialer processes 902, the browser processes 904, and the maps processes 905.

Figure 10:
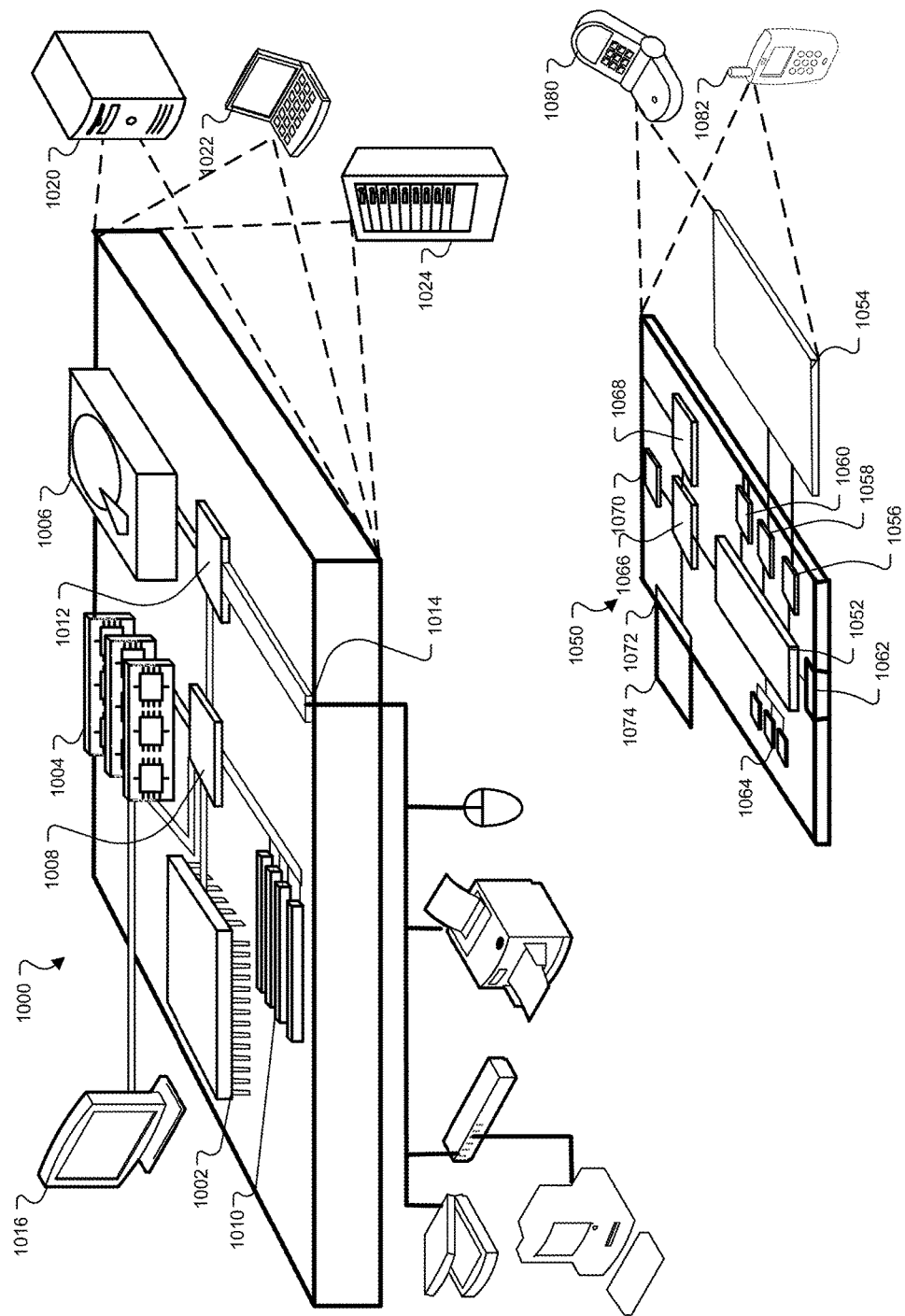
FIG. 10 shows an example of a computer device and a mobile computer device that can be used to implement the techniques described here.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosed implementations. For example, for purposes of illustration, various examples have been provided in the context of mobile devices such as cell phones or smartphones having media-capturing input devices. However, methods and systems described herein can also be provided by various other kinds of devices—whether or not those devices are traditionally characterized as mobile. In particular, for example, a digital camera may be wireless equipped to employ the methods described herein to automatically upload media to an online service provider, without contemporaneous user interaction. In addition, fixed computing devices (e.g., desktop computers equipped with image, video or sound-capturing input devices) can employ the methods described herein to automatically upload media content to an online service provider. Similarly, other types of devices, such as refrigerator or countertop computing devices, or other household appliances (e.g., microwaves, ovens, dishwashers, wine cabinets, washers, dryers, etc.), with media-capturing input components (e.g., cameras) can also employ the methods described herein to automatically upload media content to an online service provider. Various other devices are also contemplated, and in some implementations, the devices may communicate with an online service provider through a wired connection. Moreover, various examples describe media content being uploaded to a single online service provider; in some implementations, media content can be automatically uploaded to multiple online service providers. For example, a user's digital images may be automatically uploaded to a PICASA™ account, a FACEBOOK account and a FLICKR™ account if the user appropriately configures his or her device. In addition, the logic flows depicted in the figures may not require the particular order shown, or sequential order to achieve desirable results. In addition, other steps may be provided, or steps may be eliminated, from the described flows, and other components may be added to, or removed from, the described systems. Other implementations are within the scope of the following claims.

What is claimed is:
1. A computer-implemented method comprising:
before particular media has been initially generated by a mobile device, receiving, by the mobile device and from a user, pre-configuration data including:
(i) credential information associated with an account of an online media sharing service that is for the user of the mobile device,
(ii) data indicating an identifier of another user, and
(iii) data indicating a selection to transmit a notification indicating that media was uploaded to the account of the online media sharing service that is for the user of the mobile device;
determining a delay period that commences after the media is automatically uploaded to the account of the online media sharing service, wherein after the delay period elapses, the notification indicating that media was uploaded to the account of the online media sharing service that is for the user of the mobile device is transmitted to the other user;
determining that the particular media has been initially generated by the mobile device;
transmitting, to the online media sharing service, (a) the credential information, and (b) the particular media;
determining that the delay period has elapsed after transmitting the particular media to the account of the online media sharing service for the user of the mobile device; and
in response to determining that the delay period has elapsed after transmitting the particular media to the account of the online media sharing service for the user of the mobile device, transmitting, by the mobile device and to the other user according to the identifier of the other user, a particular notification indicating that the particular media was uploaded to the account of the online media sharing service that is for the user of the mobile device.

2. The computer-implemented method of claim 1, wherein the particular notification indicating that the particular media was uploaded to the account of the online media sharing service for the user of the mobile device comprises a link to the particular media on the online media sharing service.

3. The computer-implemented method of claim 1, wherein the online media sharing service comprises an online image- and video-sharing service provider.

4. The computer-implemented method of claim 1, wherein transmitting, by the mobile computing device and to the other user according to the identifier of the other user, the particular notification indicating that the particular media was uploaded to the account of the online media sharing service for the user of the mobile device is in response to:
determining one or more characteristics associated with the particular media;
comparing the one or more characteristics to one or more criteria; and transmitting the particular notification to the other user when at least one of the one or more characteristics fall within bounds of the one or more criteria.

5. The computer-implemented method of claim 1, wherein the credential information comprises access-control information associated with the account of the online media sharing service for the user of the mobile device.

6. The computer-implemented method of claim 1, wherein determining that the delay period has elapsed after transmitting the particular media to the online media sharing service for the user of the mobile device comprises:
   waiting to receive a confirmation message from the online sharing service indicating that the media has been successfully uploaded to the online media sharing service;
   receiving the confirmation message from the online media sharing service; and
   determining that the delay period has elapsed based on receiving the confirmation message from the online media sharing service.

7. The computer-implemented method of claim 1, further comprising:
   obtaining geographic location information of the mobile device when the particular media has been initially generated by the mobile device at the first time; and
   uploading the geographic location information of the mobile device with the particular media to the account of the online media sharing service at the second time.

8. A system comprising:
   one or more computers and one or more storage devices storing instructions that are operable, when executed by the one or more computers, to cause the one or more computers to perform operations comprising:
      before particular media has been initially generated by a mobile device, receiving, by the mobile device and from a user, pre-configuration data including:
         (i) credential information associated with an account of an online media sharing service that is for the user of the mobile device,
         (ii) data indicating an identifier of another user, and
         (iii) data indicating a selection to transmit a notification indicating that media was uploaded to the account of the online media sharing service that is for the user of the mobile device;
      determining a delay period that commences after the media is automatically uploaded to the account of the online media sharing service, wherein after the delay period elapses, the notification indicating that media was uploaded to the account of the online media sharing service that is for the user of the mobile device is transmitted to the other user;
      determining that the particular media has been initially generated by the mobile device;
      transmitting, to the online media sharing service, (a) the credential information, and (b) the particular media;
      determining that the delay period has elapsed after transmitting the particular media to the account of the online media sharing service for the user of the mobile device; and
      in response to determining that the delay period has elapsed after transmitting the particular media to the account of the online media sharing service for the user of the mobile device, transmitting, by the mobile device and to the other user according to the identifier of the other user, a particular notification indicating that the particular media was uploaded to the account of the online media sharing service that is for the user of the mobile device.

9. The system of claim 8, wherein the online media sharing service comprises an online image- and video-sharing service provider.

10. The system of claim 8, wherein transmitting, by the mobile computing device and to the other user according to the identifier of the other user, the particular notification indicating that the particular media was uploaded to the account of the online media sharing service for the user of the mobile device is in response to:
    determining one or more characteristics associated with the particular media;
    comparing the one or more characteristics to one or more criteria; and
    transmitting the particular notification to the other user when at least one of the one or more characteristics fall within bounds of the one or more criteria.

11. The system of claim 8, wherein the credential information comprises access-control information associated with the account of the online media sharing service for the user of the mobile device.

12. The system of claim 8, wherein determining that the delay period has elapsed after transmitting the particular media to the online media sharing service for the user of the mobile device comprises:
    waiting to receive a confirmation message from the online sharing service indicating that the media has been successfully uploaded to the online media sharing service;
    receiving the confirmation message from the online media sharing service; and
    determining that the delay period has elapsed based on receiving the confirmation message from the online media sharing service.

13. The system of claim 8, wherein the operations comprise:
    obtaining geographic location information of the mobile device when the particular media has been initially generated by the mobile device at the first time; and
    uploading the geographic location information of the mobile device with the particular media to the account of the online media sharing service at the second time.

14. A non-transitory computer-readable medium storing software comprising instructions executable by one or more computers which, upon such execution, cause the one or more computers to perform operations comprising:
    before particular media has been initially generated by a mobile device, receiving, by the mobile device and from a user, pre-configuration data including:
       (i) credential information associated with an account of an online media sharing service that is for the user of the mobile device,
       (ii) data indicating an identifier of another user, and
       (iii) data indicating a selection to transmit a notification indicating that media was uploaded to the account of the online media sharing service that is for the user of the mobile device;
    determining a delay period that commences after the media is automatically uploaded to the account of the online media sharing service, wherein after the delay period elapses, the notification indicating that media was uploaded to the account of the online media sharing service that is for the user of the mobile device is transmitted to the other user;
    determining that the particular media has been initially generated by the mobile device;

transmitting, to the online media sharing service, (a) the credential information, and (b) the particular media;

determining that the delay period has elapsed after transmitting the particular media to the account of the online media sharing service for the user of the mobile device; and in response to determining that the delay period has elapsed after transmitting the particular media to the account of the online media sharing service for the user of the mobile device, transmitting, by the mobile device and to the other user according to the identifier of the other user, a particular notification indicating that the particular media was uploaded to the account of the online media sharing service that is for the user of the mobile device.

15. The computer-readable medium of claim 14, wherein the particular notification indicating that the particular media was uploaded to the account of the online media sharing service for the user of the mobile device comprises a link to the particular media on the online media sharing service.

16. The computer-readable medium of claim 14, wherein the particular notification indicating that the particular media was uploaded to the account of the online media sharing service for the user of the mobile device comprises a link to the particular media on the online media sharing service.

17. The computer-readable medium of claim 14, wherein the online media sharing service comprises an online image- and video-sharing service provider.

18. The computer-readable medium of claim 14, wherein transmitting, by the mobile computing device and to the other user according to the identifier of the other user, the particular notification indicating that the particular media was uploaded to the account of the online media sharing service for the user of the mobile device is in response to:

determining one or more characteristics associated with the particular media;

comparing the one or more characteristics to one or more criteria; and transmitting the particular notification to the other user when at least one of the one or more characteristics fall within bounds of the one or more criteria.

19. The computer-readable medium of claim 14, wherein the credential information comprises access-control information associated with the account of the online media sharing service for the user of the mobile device.

20. The computer-readable medium of claim 14, wherein determining that the delay period has elapsed after transmitting the particular media to the online media sharing service for the user of the mobile device comprises:

waiting to receive a confirmation message from the online sharing service indicating that the media has been successfully uploaded to the online media sharing service;

receiving the confirmation message from the online media sharing service; and determining that the delay period has elapsed based on receiving the confirmation message from the online media sharing service.

* * * * *

UNITED STATES PATENT AND TRADEMARK OFFICE
CERTIFICATE OF CORRECTION

| | | |
|---|---|---|
| PATENT NO. | : 10,484,457 B1 | Page 1 of 1 |
| APPLICATION NO. | : 15/493527 | |
| DATED | : November 19, 2019 | |
| INVENTOR(S) | : Wagner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 198 days.

Signed and Sealed this
Twenty-fourth Day of January, 2023

Katherine Kelly Vidal
*Director of the United States Patent and Trademark Office*